(12) United States Patent
Johnson et al.

(10) Patent No.: US 8,312,954 B2
(45) Date of Patent: Nov. 20, 2012

(54) FRAME FOR A TWO WHEELED ELECTRIC VEHICLE

(75) Inventors: Karl Ashley Johnson, San Francisco, CA (US); Jorah Wyer, San Francisco, CA (US); James Parker, Sante Fe, NM (US); Jon Wagner, Belmont, CA (US)

(73) Assignee: Mission Motor Company, San Francisco, CA (US)

( * ) Notice: Subject to any disclaimer, the term of this patent is extended or adjusted under 35 U.S.C. 154(b) by 90 days.

(21) Appl. No.: 13/092,678

(22) Filed: Apr. 22, 2011

(65) Prior Publication Data

US 2011/0259660 A1  Oct. 27, 2011

Related U.S. Application Data

(60) Provisional application No. 61/327,071, filed on Apr. 22, 2010.

(51) Int. Cl.
*B62D 61/02* (2006.01)
*B62K 11/02* (2006.01)

(52) U.S. Cl. ........ 180/220; 180/312; 180/6.5; 180/65.1; 180/219; 280/281.1; 280/274

(58) Field of Classification Search ............... 180/220, 180/312, 6.5, 65.1, 219; 280/274, 281.1
See application file for complete search history.

(56) References Cited

U.S. PATENT DOCUMENTS

| | | | |
|---|---|---|---|
| 3,590,915 A | 7/1971 | Riedel et al. | |
| 4,301,965 A | 11/1981 | Ritter et al. | |
| 5,207,288 A | 5/1993 | Ono | |
| 5,416,702 A | 5/1995 | Kitagawa et al. | |
| 5,422,558 A | 6/1995 | Stewart | |
| 5,487,002 A | 1/1996 | Diller et al. | |
| 5,666,040 A | 9/1997 | Bourbeau | |
| 5,889,385 A | 3/1999 | Podrazhansky et al. | |
| 5,892,346 A | 4/1999 | Moroto et al. | |
| 5,898,282 A | 4/1999 | Drozdz et al. | |
| 5,965,996 A | 10/1999 | Arledge et al. | |
| 6,047,786 A | 4/2000 | Stevenson et al. | |
| 6,148,335 A | 11/2000 | Haggard et al. | |
| 6,242,873 B1 | 6/2001 | Drozdz et al. | |
| 6,326,765 B1 | 12/2001 | Hughes et al. | |
| 6,679,345 B2 | 1/2004 | Hirayama et al. | |
| 6,724,165 B2 | 4/2004 | Hughes | |
| 6,899,975 B2 | 5/2005 | Watanabe et al. | |
| 7,255,191 B2 | 8/2007 | Baldwin et al. | |
| 7,291,422 B2 | 11/2007 | Oogami et al. | |
| 7,404,720 B1 | 7/2008 | Frey et al. | |
| 7,433,794 B1 | 10/2008 | Berdichevsky et al. | |

(Continued)

*Primary Examiner* — Tashiana Adams
*Assistant Examiner* — Marlon Arce
(74) *Attorney, Agent, or Firm* — Jeffrey Schox; Diana Lin (57) ABSTRACT

A frame for an electric vehicle with a motor and a transmission, the frame including a steering head unit, a power unit casing, a left side frame and a right side frame. The steering head unit includes a steering head, a left extension and a right extension, wherein the left extension and right extension extend at an angle from the steering head. The power unit casing encloses the motor and the transmission, orienting the gearbox of the transmission vertically underneath the motor. The left and right side frames mount, on one end, to the left and right extensions of the steering head unit, respectively, wherein the other end mounts to the left and right sides of the power unit casing, respectively. The steering head unit, the power unit, the left side frame and the right side frame form an open cage, configured to accept a battery assembly.

36 Claims, 7 Drawing Sheets

U.S. PATENT DOCUMENTS

| | | |
|---|---|---|
| 7,625,665 B2 | 12/2009 | Jeon et al. |
| 7,659,029 B2 | 2/2010 | Ota et al. |
| 7,816,029 B2 | 10/2010 | Takamatsu et al. |
| 7,855,011 B2 | 12/2010 | Meschter |
| 7,858,224 B2 | 12/2010 | Kim et al. |
| 2001/0000394 A1* | 4/2001 | Whittaker .................... 180/220 |
| 2003/0016677 A1 | 1/2003 | Mauritz |
| 2003/0033461 A1 | 2/2003 | Malik et al. |
| 2003/0152830 A1 | 8/2003 | Eaves |
| 2004/0080565 A1 | 4/2004 | Vega et al. |
| 2004/0115511 A1 | 6/2004 | Holler et al. |
| 2004/0131925 A1 | 7/2004 | Jenson et al. |
| 2004/0238242 A1* | 12/2004 | Honda et al. ................ 180/65.1 |
| 2005/0058892 A1 | 3/2005 | Ovshinsky et al. |
| 2005/0062456 A1 | 3/2005 | Stone et al. |
| 2005/0151657 A1 | 7/2005 | Lockhart et al. |
| 2006/0073378 A1 | 4/2006 | Hamery et al. |
| 2006/0149974 A1 | 7/2006 | Rotem et al. |
| 2006/0214641 A1 | 9/2006 | Cho |
| 2006/0286448 A1 | 12/2006 | Snyder et al. |
| 2007/0009787 A1 | 1/2007 | Straubel et al. |
| 2007/0080664 A1 | 4/2007 | Maguire et al. |
| 2007/0105010 A1 | 5/2007 | Cassidy |
| 2007/0188147 A1 | 8/2007 | Straubel et al. |
| 2007/0218353 A1 | 9/2007 | Straubel et al. |
| 2007/0252556 A1 | 11/2007 | West et al. |
| 2007/0284953 A1 | 12/2007 | Lyons et al. |
| 2008/0018299 A1 | 1/2008 | Renda |
| 2008/0042971 A1 | 2/2008 | Sachs |
| 2008/0072081 A1 | 3/2008 | Helfinstine et al. |
| 2008/0233469 A1 | 9/2008 | Drozdz et al. |
| 2008/0241667 A1 | 10/2008 | Kohn et al. |
| 2008/0280192 A1 | 11/2008 | Drozdz et al. |
| 2008/0311468 A1 | 12/2008 | Hermann et al. |
| 2008/0312782 A1 | 12/2008 | Berdichevsky et al. |
| 2008/0315839 A1 | 12/2008 | Hermann |
| 2009/0113815 A1 | 5/2009 | Woodcock |
| 2009/0123814 A1 | 5/2009 | Cabot et al. |
| 2009/0261785 A1 | 10/2009 | Cabot et al. |
| 2009/0263708 A1 | 10/2009 | Bender et al. |
| 2010/0078246 A1* | 4/2010 | Sasage et al. ................ 180/220 |
| 2010/0078248 A1* | 4/2010 | Kanno et al. ................ 180/220 |
| 2010/0216013 A1 | 8/2010 | Kim |
| 2010/0294582 A1* | 11/2010 | Eguchi et al. ................ 180/220 |
| 2010/0330408 A1 | 12/2010 | Yoon et al. |
| 2011/0070474 A1 | 3/2011 | Lee et al. |
| 2011/0177371 A1* | 7/2011 | Belton ............................ 429/98 |
| 2011/0189521 A1 | 8/2011 | Lee et al. |

* cited by examiner

FRAME FOR A TWO WHEELED ELECTRIC VEHICLE

CROSS-REFERENCE TO RELATED APPLICATIONS

This application claims the benefit of U.S. Provisional Application No. 61/327,071 filed 22 Apr. 2010, which is incorporated in its entirety by this reference.

TECHNICAL FIELD

This invention relates generally to the electric vehicle field, and more specifically to a new and useful vehicle frame in the two-wheeled electric vehicle field.

BACKGROUND

To match the power and range capabilities of gas powered vehicles, electric vehicles typically require a battery assembly with a substantially high power density. Battery assemblies for electric vehicles, as a result, require a substantially large number of cells. The cells within the battery assembly are preferably arranged to achieve a substantially high power density within the battery assembly, allowing the electric vehicle to carry a substantial amount of electric power. The cells within the battery assembly are also preferably arranged to increase efficiency within the battery assembly. For example, the cells within the battery assembly are preferably arranged to minimize resistance within the battery assembly. Increased resistance may lead to power dissipation in the form of heat, decreasing the efficiency of the battery assembly. One method to minimize resistance is to decrease the length of wiring between each cell within the battery assembly. Individual cells are preferably coupled to each other to decrease the length of wiring between each cell, thus forming a unitary battery assembly. A unitary battery assembly may also facilitate maintenance of the vehicle by simplifying the process of replacing the battery assembly by allowing one unitary battery assembly to be swapped out (or "hot swapped") for another unitary battery assembly. However, because the number of cells is substantially large, the resulting unitary battery assembly is typically very large, and though commonly available frames for two-wheeled electric vehicles (for example, motorcycles) may provide a suitable volume to accommodate gas powered systems, they do not provide a volume that can accommodate to such a large battery assembly. For example, conventional side frames generally curve in to join at the steering head unit, limiting the volume available to accommodate a substantially coherent battery assembly to either the volume above the join and below the rider's chest (when in tucked riding position), or to the volume below the join and above the ground (limited by the motorcycle's lean-angle planes).

Thus, there is a need in the two-wheeled electric vehicle field to create a new and useful electric vehicle with a frame that provides a substantially large volume to accommodate to large battery assemblies, thus providing two-wheeled electric vehicles with the capability of storing enough electric power in an efficient manner to substantially match the power and range of gas powered two-wheeled vehicles.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 2A:
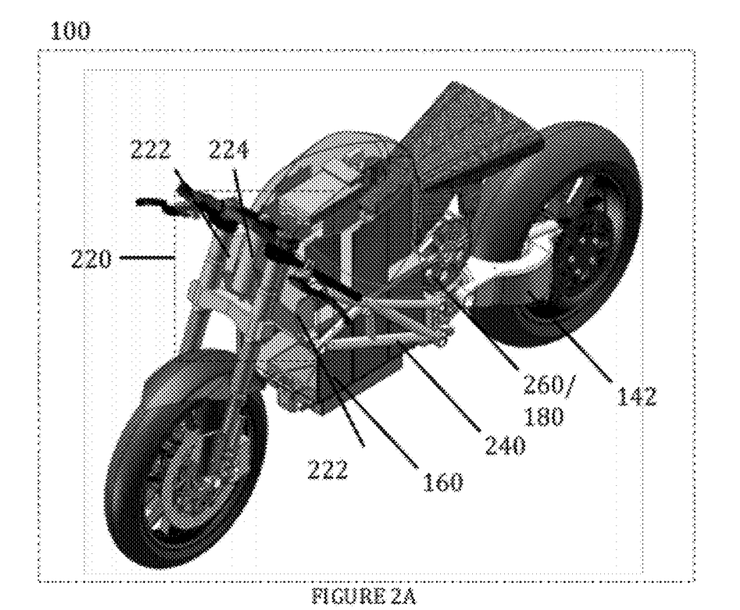
FIGS. 2A and 2B are schematic representations of the electric vehicle, as seen from an orthogonal view and a left hand side view, respectively.
Figure 2B:
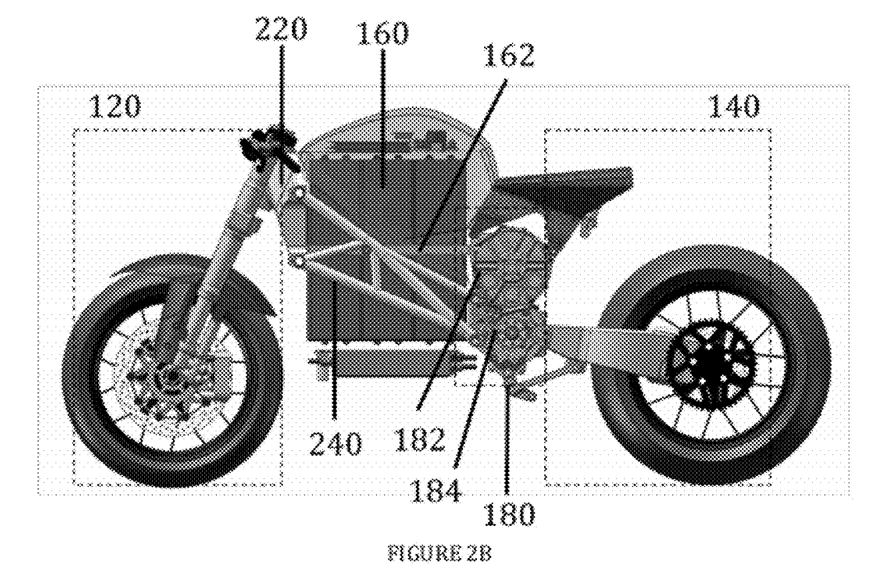
Figure 3A:
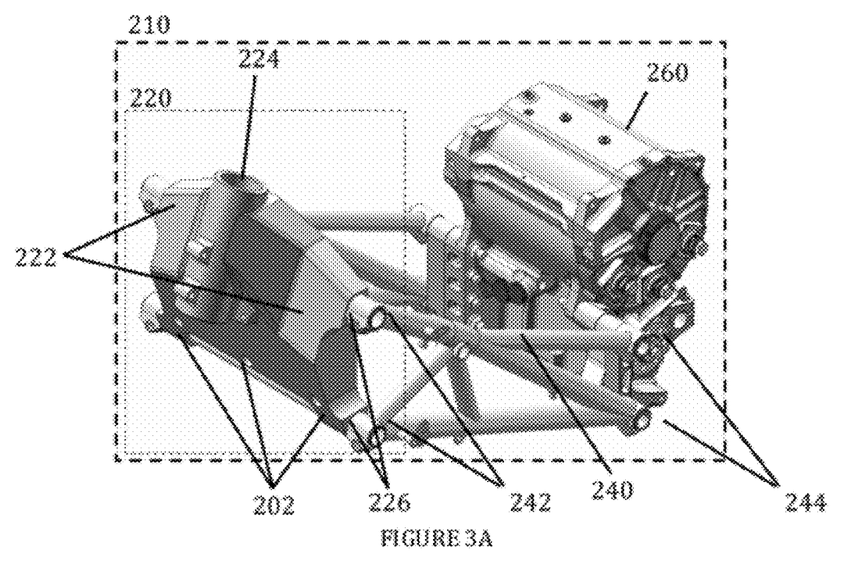
FIGS. 3A and 3B are schematic representations of the cage, comprising the side frames assembled to the steering head unit and power unit casing, as seen from an orthogonal view and a rear view without the power unit casing, respectively.

As shown in FIGS. 2A and 2B, the electric vehicle 100 of the preferred embodiments includes a load-bearing frame 200 supporting a power unit 180 including an electric motor and a transmission 184, a removable battery assembly 160, a front suspension assembly 120, and a rear suspension assembly 140. The frame 200 comprises a steering head unit 220 with a left and a right extension 222, two substantially identical side frames 240 (i.e. a left and a right side frame 240), and a power unit casing 260, which also encases the power unit 180. As shown in FIG. 3A, the steering head unit 220, side frames 240, and power unit casing 260 couple together to define a cage 210, substantially open and unobstructed on the top and bottom, that is substantially occupied by the battery assembly 160. The defined cage 210 preferably has a rectangular prismatic geometry, but may alternately have a tetrahedral prismatic geometry, a quadrilateral prismatic geometry, or any geometry that suitably accommodates the battery assembly 160. The electric vehicle 100 is preferably a two-wheeled electric motorcycle, but may alternately be an electric bicycle, any two-wheeled electric vehicle, a three-wheeled vehicle with one wheel in the front and two wheels in the rear, or any other suitable electric vehicle.

Figure 1:
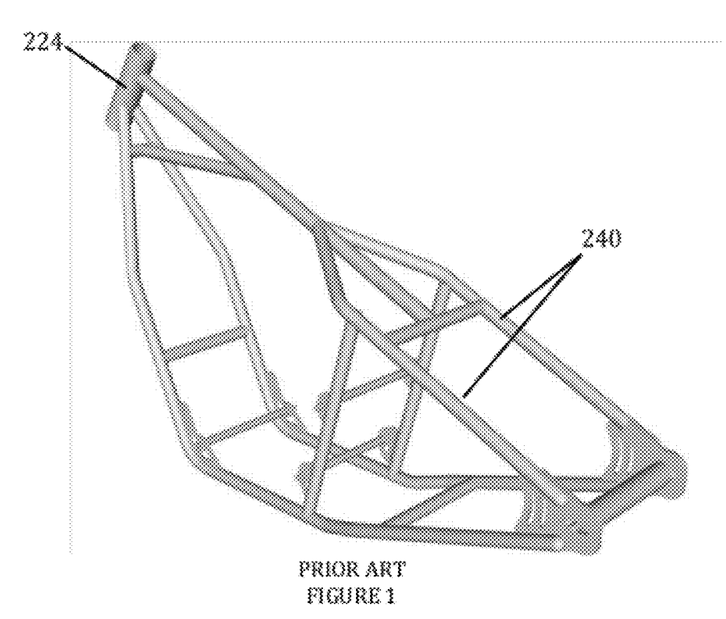
FIG. 1 is a schematic representation of a PRIOR ART frame for a two-wheeled vehicle.

This electric vehicle 100 is distinguished over conventional two-wheeled vehicles in several ways. First, in order to accommodate the substantially large battery assembly 160, the frame 200 defines a prismatic cage 210, open on the top and bottom, through which the battery assembly 160 can extend. As mentioned above and as shown in FIG. 1, conventional side frames 240 curve in to join at the steering head 224, which limits the space available to accommodate a substantially coherent battery assembly 160 to either: the volume above the join and below the rider's chest (when in tucked riding position), or to the volume below the join and above the ground (limited by the motorcycle's lean-angle planes). By utilizing a steering head unit 220 with left and right extensions 222, the side frames 240 may couple to the extensions 222 instead of directly coupling to the steering head 224, effectively opening up the top portion of the frame 200 to allow the battery assembly 160 to extend through. Second, because the battery assembly 160 now preferably occupies the space previously occupied by the motor 182, the motor 182 is disposed near the rear of the vehicle. This is possible because the motor 182 is an electric motor 182, which is lighter than the battery assembly 160 and conventional motors (and thus does not adversely affect the weight distribution of the vehicle), and it requires less maintenance than a conventional combustion engine (and can thus be placed in a less-accessible area). Third, to accommodate the contiguous battery assembly 160, conventional frame 200 geometries that traverse through the interior of the vehicle and directly transfer driving loads between the front suspension and rear suspension, cannot be used because they would traverse through the battery assembly 160. Instead, the frame 200 of the present invention distributes and transfers driving loads through the steering head unit 220, side frames 240, and power unit casing 260 between the front suspension assembly 120 and the rear suspension assembly 140. In other words, the electric vehicle 100 of the preferred embodiments utilizes the power unit casing 260 as a load-bearing element.

As shown in FIGS. 2A and 2B, the front suspension assembly 120 functions to couple the front wheel of the electric vehicle 100 to the frame 200, and transfers load from the front wheel to the frame 200. The front suspension assembly 120 also functions to enable a rider to steer the vehicle. The front suspension assembly 120 preferably comprises two fork tubes with suspension, a steering tube 122, and handlebars. The fork tubes are preferably located on either side of the front wheel, and preferably couple the axle of the front wheel to the steering head unit 220 by clamping to the steering head unit 220 with triple clamps. The fork tubes are preferably telescopic forks, but may alternately be any other suitable motorcycle forks. The steering tube 122 is a rigid tube, and is preferably statically coupled to the handlebars such that a circular translation of the handlebars (e.g. turning the handlebars to the left or right) rotates the steering tube 122 about its central axis.

The rear suspension assembly 140 functions to couple the rear wheel of the electric vehicle 100 to the frame 200, and transfers loads from the rear wheel to the frame 200. The rear suspension preferably comprises a swingarm 142 and a shock absorber. The swingarm 142 functions to couple the axle of the rear wheel to the frame 200; more specifically, the swingarm 142 couples the rear wheel axle to the power unit casing 260 at the swingarm attachment point 264. The swingarm-casing couple preferably includes bearings, such that the swingarm 142 can rotate about the attachment point. The rear suspension assembly 140 preferably includes a dual-sided swingarm 142, wherein the swingarm extends to the rear wheel on both sides (wherein the power unit casing 260 includes a swingarm attachment point 264 on each side, accordingly), but may alternately include a single-sided swingarm 142. The shock absorbers of the rear suspension assembly 140 function to absorb shocks during operation, and are preferably hydraulic shock absorbers but may alternately be any suitable shock absorber.

The battery assembly 160 of the electric vehicle 100 functions to provide the power to the electric motor 182. The battery assembly 160 preferably comprises a plurality of flat, prismatic secondary cells coupled together along their broad faces in the thickness direction. However, the battery assembly 160 may alternatively be composed of cylindrical cells or cells of any other suitable shape. The battery assembly 160 preferably has a substantially rectangular prismatic shape, but may alternately have any other suitable shape. The battery assembly 160 preferably couples to, and substantially seats, within the cage 210. The battery assembly 160 is preferably coupled to the cage 210 by nuts and bolts, but may alternately be coupled by clips, clamps, hooks, or any removable coupling means. The battery assembly 160 is preferably removable from the frame 200 from the top of the frame 200, allowing a technician or the user to lift a battery assembly 160 out from the frame 200 and relatively easily "drop" a battery assembly 160 into the frame 200 during maintenance or replacement of the battery assembly 160, allowing for relatively fast replacement (or "hot-swapping") of battery packs 40 from the vehicle. The battery assembly 160 may, however, be removable from the frame 200 in any other suitable direction. The battery assembly 160 may include groups of cells, as shown in FIGS. 2A and 2B, that are electrically coupled to each other and stacked together to function as a unitary battery assembly 160. The battery assembly 160 preferably includes two main groups of cells, one group extending through the bottom of the cage 210 (and below where the user places his or her legs during use of the vehicle) and the other extending through the top. The lower group of cells preferably substantially fully occupies the cage 210. The upper group of cells, however, is preferably partially recessed from the perimeter of the cage 210 both at the front and rear of the defined volume to allow clearance for the legs of the user and for the rotation of the steering assembly. The battery assembly 160 preferably includes six groups of cells in total, wherein the lower group of cells include three groups of cells that each contain 36 prismatic cells and the upper group of cells include one group of cells that contains 36 prismatic cells arranged in between two groups of cells that each contain 24 prismatic cells. However, any other suitable arrangement of the battery assembly 160 may be used.

The battery assembly 160 preferably further includes an internal support structure 162 that functions as a part of the frame 200. The battery assembly 160 preferably couples to the internal support structure 162, such that the internal support structure 162 also functions to provide a structure to the battery assembly 160 when the battery assembly 160 is removed from the frame 200. For example, in the variation where the battery assembly 160 includes groups of cells that are stacked together, each group of cells is preferably fixed to the internal support structure 162. However, the internal support structure 162 may provide support to the battery assembly 160 in any other suitable arrangement. As shown in FIG. 2B, the internal support structure 162 is preferably substantially flat and rigid, for example, a flat piece of steel, aluminum, or any other suitable material with any other geometry (e.g. a truss structure) with substantial rigidity to resist torsional forces. Because the cells are preferably prismatic cells that are stacked to form a rectangular prism, a flat geometry allows the internal support structure 162 to accommodate to the shape of the battery assembly 160. However, the internal support structure 162 may be of any other suitable shape or material.

Figure 4A:
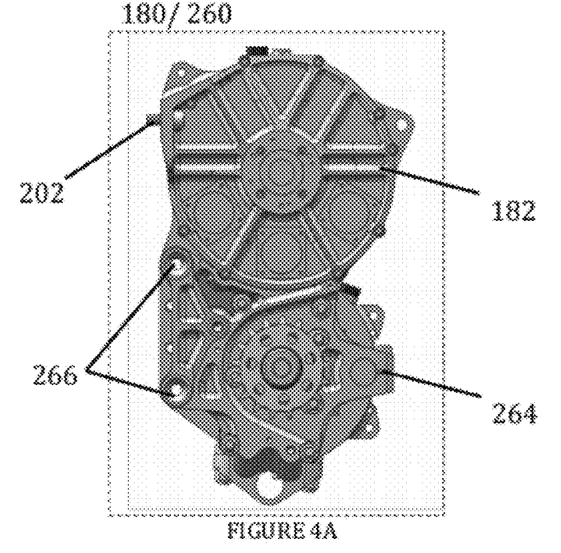
FIGS. 4A and 4B are schematic representations of the power unit casing with the power unit, as seen from a first side view (left hand side of the vehicle) and a second side view (right hand side of the vehicle), respectively.
Figure 4B:
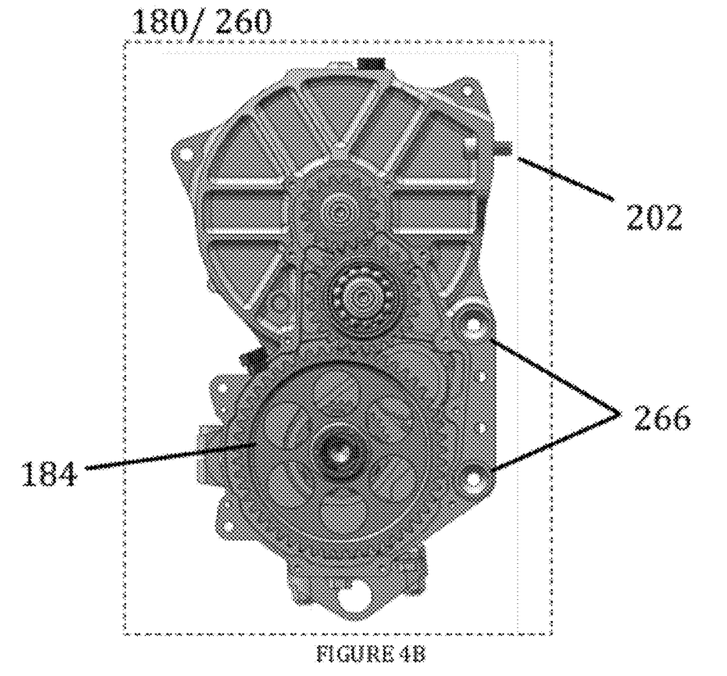
Figure 5:
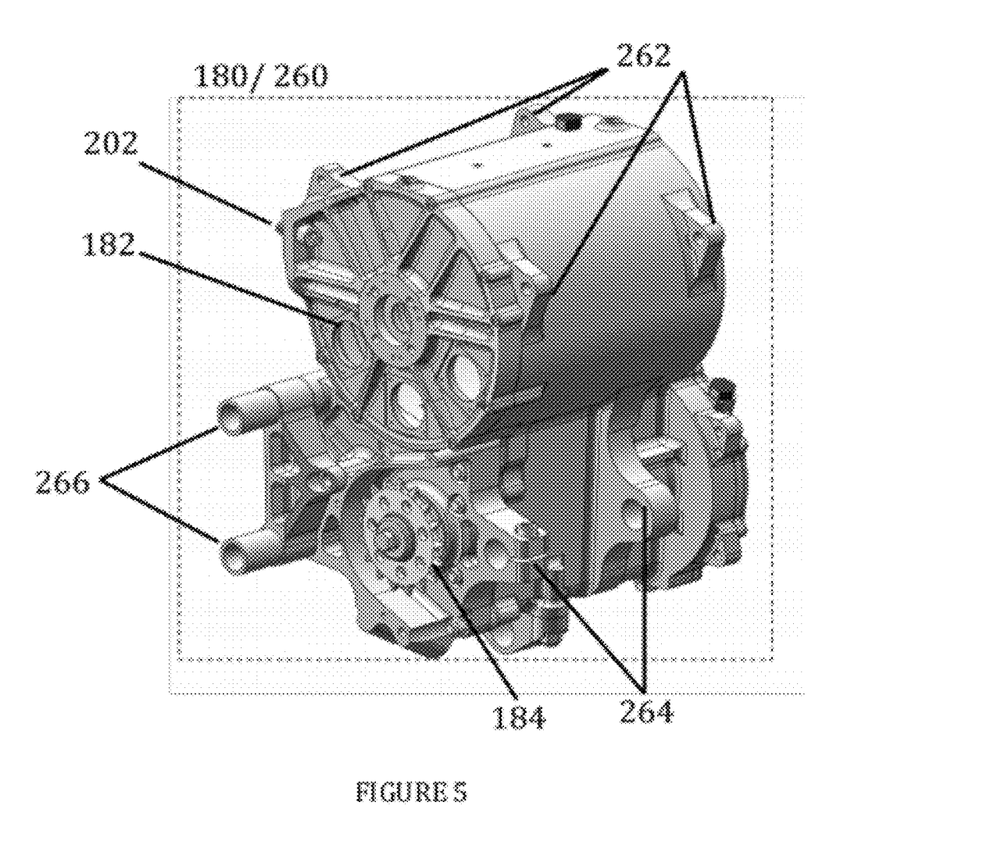
FIG. 5 is a schematic representation of the power unit casing as seen from an orthogonal view.

The power unit 180 of the electric vehicle 100 functions to provide power to the vehicle. As shown in FIGS. 4A and 4B, the power unit 180 preferably comprises an electric motor 182 and a transmission 184, and is preferably electrically coupled to the battery assembly 160. The electric motor 182 of the power unit 180 functions to convert electrical power into mechanical power, and is preferably an AC motor, but may alternately be a permanent-magnet motor (e.g. a brushed DC motor, brushless DC motor, or coreless DC motor) or a universal motor. The electric motor 182 preferably includes two end bearings. The electric motor 182 is preferably directly coupled to the transmission 184, and preferably directly drives the transmission 184. The transmission 184 preferably comprises a gearbox coupled to a chain or belt drive (including a sprocket on the gearbox coupled to a gear on the wheel axle by a chain or belt, respectively), but may alternately comprise a gearbox coupled to a driveshaft (e.g. a countershaft or crankshaft), preferably with two end bearings. The power unit 180 is preferably laid out vertically (rather than horizontally, as shown in conventional two-wheeled vehicles), with the motor 182 arranged vertically, preferably directly, above the transmission 184. This vertical arrangement allows the transmission 184 enough clearance for standard gears and sprockets to be used, decreasing the overall cost of the vehicle. If there is an insufficient amount of space for the transmission 184, the transmission 184 may need to employ non-standard gear or sprocket ratios, resulting in the need to manufacture non-standard parts, thus increasing manufacturing cost. The power unit 180 is preferably located near the rear wheel, and is preferably coupled to the rear wheel by the swingarm 142 of the rear suspension. Furthermore, the majority of the motor 182 is preferably located substantially above the rear wheel. This allows for a sufficient amount of variation in arranging the sprocket in a position relative to the pivot of the swingarm 142 that provides for desired vehicle suspension characteristics. In particular, in the variation of the two-wheeled vehicle that is a motorcycle, the position of the sprocket relative to the pivot point of the swingarm 142 (the swingarm attachment point 264, as shown in FIG. 5) has a substantial effect on the performance of the suspension of the motorcycle during acceleration and other vehicle maneuvers. If the motor 182 were arranged substantially at the same height as the front and rear wheels, the number of possible locations of the drive sprocket is substantially reduced because of the volume that is occupied by the motor 182. Similarly, by arranging the motor 182 substantially above the rear wheel, the length of the swingarm 142 may be increased for the same wheelbase (distance between the front wheel and the rear wheel). If the motor 182 were arranged substantially at the same height as the front and rear wheels, because both the battery assembly 160 and the motor 182 now occupy the space between the front and rear wheels, the swingarm 142 is substantially short to accommodate. If the swingarm 142 is relatively short, the vehicle dynamics may be adversely affected. For example, the handling and responsiveness of the vehicle may be decreased. Alternatively, the wheelbase (distance between the front wheel and the rear wheel) may be increased.

The Frame

Figure 6A:
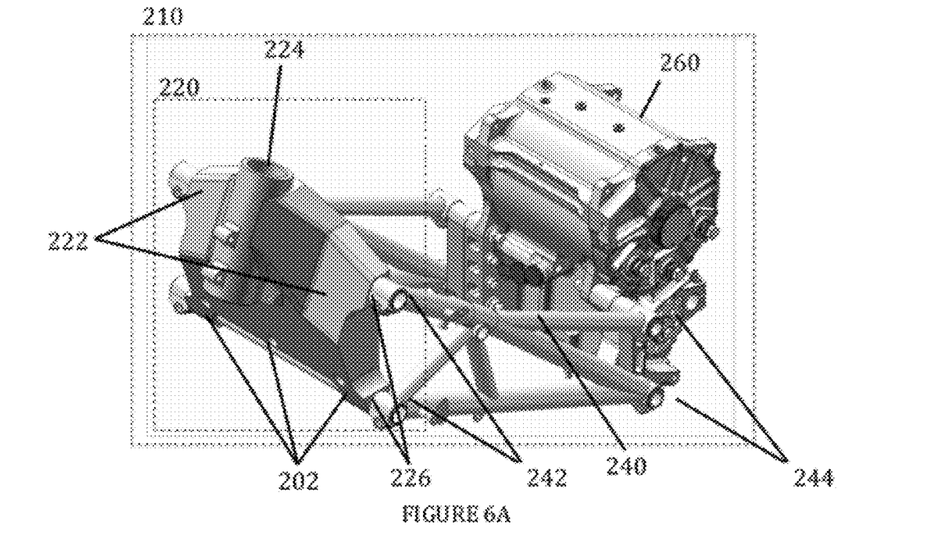
FIGS. 6A and 6B are schematic representations of the internal support structure of the battery assembled to the steering head unit, side frames, and power unit casing, as seen from an orthogonal view and a side view, respectively.
Figure 6B:
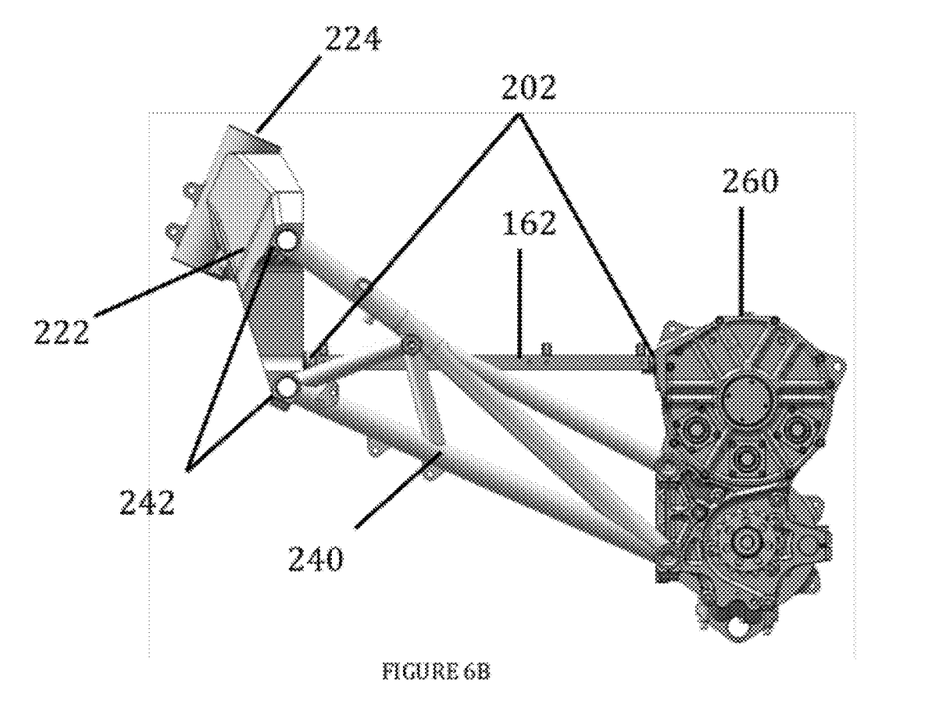

The frame 200 of the electric vehicle 100 functions to transmit and distribute forces between the front suspension assembly 120 and rear suspension assembly 140, to support the power unit 180 and battery assembly 160, and to support the rider during operation. As shown in FIG. 3A, the frame 200 comprises a steering head unit 220 with a left and a right extension 222, a power unit casing 260, and a left and right frame 200 that couple the steering head unit 220 to the power unit casing 260. The aforementioned components are preferably statically coupled together (i.e. the left side frame 240 is mounted to the left extension 222 and the left side of the power unit casing 260 and the right side frame 240 is mounted to the right extension 222 and to the right side of the power unit casing 260) to form a cage 210 with a substantially unobstructed top and bottom. As shown in FIGS. 6A and 6B, the frame 200 may additionally comprise the internal support structure 162 of the battery assembly 160, wherein the internal support structure 162 couples to the cage 210 to provide the frame 200 with enough structural stability to withstand vehicular operational forces.

Figure 3B:
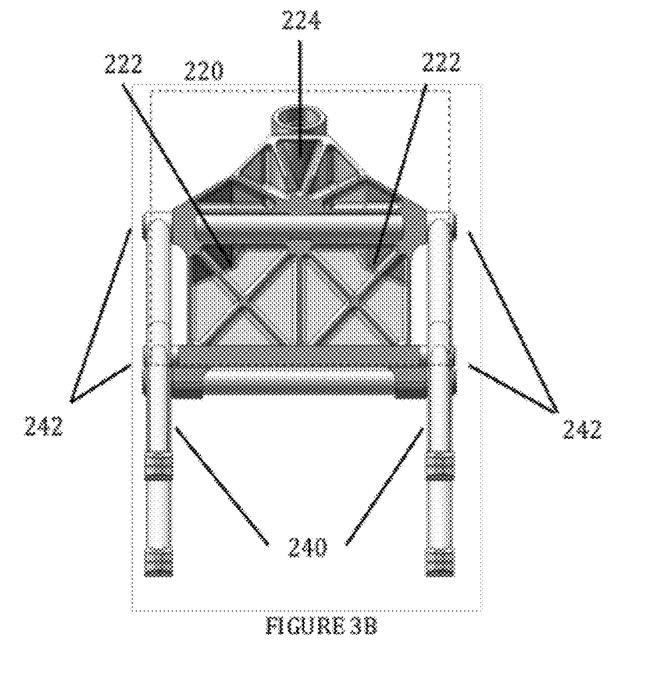

As shown in FIGS. 2A and 2B, the steering head unit 220 of the frame 200 functions to mount to the front suspension and the side frames 240, and to transfer forces from the front suspension to the side frames 240. As shown in FIGS. 3, 6A and 6B, the steering head unit 220 comprises a steering head 224, a left extension 222, and a right extension 222, wherein the left and right extensions 222 extend out from the steering head 224 to the left and right, respectively, such that the steering head unit 220 is symmetric about the longitudinal axis of the vehicle. The angle formed between the left and right extensions 222 preferably approximates a straight angle (i.e. 180° between the left extension 222 and the right extension 222), but may alternately be an acute angle (e.g. 135°, 90°, or 45°) or an obtuse angle, wherein the angle is disposed on the side of the steering head unit 220 forming the interior of the cage 210.

The steering head 224 of the steering head unit 220 functions to couple to the steering tube 122 of the front suspension assembly 120. The steering head 224 is preferably of a cylindrical tube shape, into which the steering tube 122 is inserted, allowing the steering tube 122 to rotate within the steering head 224 to steer the vehicle. The steering head 224 may also include bearings that decrease resistance to rotation of the steering tube 122 within the steering head 224. However, the steering head 224 may alternatively be of any other suitable shape or arrangement. Because forces felt by the front wheel are directly transferred to the steering head 224, the steering head 224 is preferably rigidly coupled to the left and right extensions 222 to substantially prevent undesired deflection between the steering head 224 and the steering head unit 220. Excessive deflection between the steering head 224 and the left and right extensions 222 may result in the steering head 224 breaking off from the frame 200 or plastically deforming. Additionally, rigid coupling may decrease chassis deflections caused by the moment that result from forces applied to the front wheel (for example, during braking when there is a substantial amount of force on the front wheel to stop the vehicle). The rigid connection is preferably achieved by providing a truss structure within the left and right extensions 222 of the steering head unit 220, as shown in the back view of the steering head unit 220 as shown in FIG. 3B, that is functions to distribute forces from the steering head 224 to the left and right extensions 222. However, any other suitable method may be used to provide a substantially rigid connection between the steering head 224 and the left and right extensions 222. The left and right extensions 222 preferably each include a number of attachment points 226 for the left and right side frames 240, respectively. The side frame attachment points 226 preferably arrange each of the side frames 240 symmetrically about the long axis of the vehicle. The face of the steering head unit 220 that forms the front interior surface of the cage 210 is preferably flat and substantially perpendicular to the side frames 240, but may alternately be angled or curved and angled relative to the side frames 240. The steering head unit 220 is preferably made of a substantially stiff material, such as steel or aluminum, and is preferably cast, but may alternatively be machined into the desired geometry or manufactured using any other suitable process.

The power unit casing 260 of the power unit 180 functions to enclose the power unit 180 as well as to provide a load-bearing member for the frame 200. The power unit casing 260 defines the rear side of the cage 210. As shown in FIG. 5, the power unit casing 260 is preferably composed of a single large unit that encloses the power unit 180, but may alternately be several different units coupled together. The power unit casing 260 may additionally include a removable plate on one side to facilitate power unit 180 assembly and disassembly. Furthermore, the power unit casing 260 preferably locates motor 182 components relative to the transmission 184 components. For example, in one embodiment, the power unit casing 260 preferably locates one end bearing of the motor shaft and both end bearings of the countershaft of the transmission 184, wherein the other end bearing of the motor shaft is supported by the bolt on plate. The power unit casing 260 preferably traces the shapes of the motor 182 and transmission 184, such that is appears as a two cylinders coupled to each other by their radial surfaces. However, the power unit casing 260 may alternately be a rectangular prism, a large cylinder, or any other suitable shape. The power unit casing 260 preferably includes two side frame attachment points 266 on the each side of the casing (e.g. along the flat ends of the cylinder) to couple the power unit casing 260 to the upper and lower bars of the side frames 240, but may alternately include one side frame attachment point 266 or any suitable number of side frame attachment points 266 located at any suitable position on the casing. The side frame attachment points 266 are preferably arranged symmetrically about the mid-plane of the vehicle. The arrangement of the side frame attachment points 266 relative to the side frame attachment points 266 of the steering frame 200 preferably allows for the side frames 240 to substantially follow the shape of the battery pack. For example, in the variation of the battery pack that is substantially rectangular (as shown in the FIGURES), the side frame attachment points 266 are preferably arranged on a plane that is parallel to the mid-plane of the vehicle and intersects with the side frame attachment points 266 of the steering head 224, allowing each of the side frames 240 to extend parallel to the mid-plane of the vehicle and defining a rectangular cage 210 that is symmetric about the mid-plane of the vehicle. More specifically, the side frame attachment points 266 of the power unit casing 260 and the side frame attachment points 266 of the steering head 224 that couple to the left side frame 240 are preferably all located on a plane that is parallel to the mid-plane of the vehicle. Likewise, the side frame attachment points 266 that couple to the right side frame 240 are preferably all located on another plane that is parallel to the mid-plane of the vehicle. However, the side frame attachment points 266 and the side frame attachment points 266 may alternatively be located on any suitable plane that allows the side frames 240 to substantially match the shape of the battery pack 40. For example, in the variation of the battery pack that is of a substantially wedge shape, the side frame attachment points 266 and may be arranged to allow the side frames 240 to substantially follow the wedge shape of the battery pack, substantially minimizing the total amount of unoccupied volume defined by the cage 210. The power unit casing 260 may also include seat attachment points 262 that couple to the seat, wherein the seat attachment points 262 are preferably located near the top of the power unit casing 260. The power unit casing 260 may also include foot peg attachment points on each side of the casing. The side frame attachment points 266 of the power unit casing 260 are preferably located anterior to the seat attachment points 262 and foot peg attachment points, but may alternatively be posterior. Furthermore, the side frame attachment points 266 are preferably lower than the foot peg attachment points, but may alternately be higher or bound the foot peg attachment points (wherein one side frame attachment point 266 is higher than the foot peg attachment point and another is lower than the foot peg attachment point).

The power unit casing 260 also preferably includes a swingarm attachment point 264. As shown in FIG. 5, the swingarm attachment point 264 is preferably a cylindrical connection that allows the swingarm 142 to pivot about the attachment point on an axis that is substantially perpendicular to the mid-plane of the vehicle. This allows for the rear suspension assembly 140 to absorb shock that may result from irregularities on the road or any other forces that the rear wheel may experience. However, the swingarm attachment point 264 may be of any other suitable arrangement. The power unit casing 260 is preferably rigid and made of metal (e.g. steel or aluminum), but may alternately be plastic, ceramic, or any other rigid, load bearing material. The power unit casing 260 is preferably cast, but may alternately be welded, sintered, or made from any other suitable method. The power unit 180 may also include a cover (not pictured) that covers the transmission 184, which may function to protect the user from coming into contact with the gears. The cover may also function to prevent contaminants from entering the transmission 184, and to contain lubrication for the transmission 184.

Figure 7:
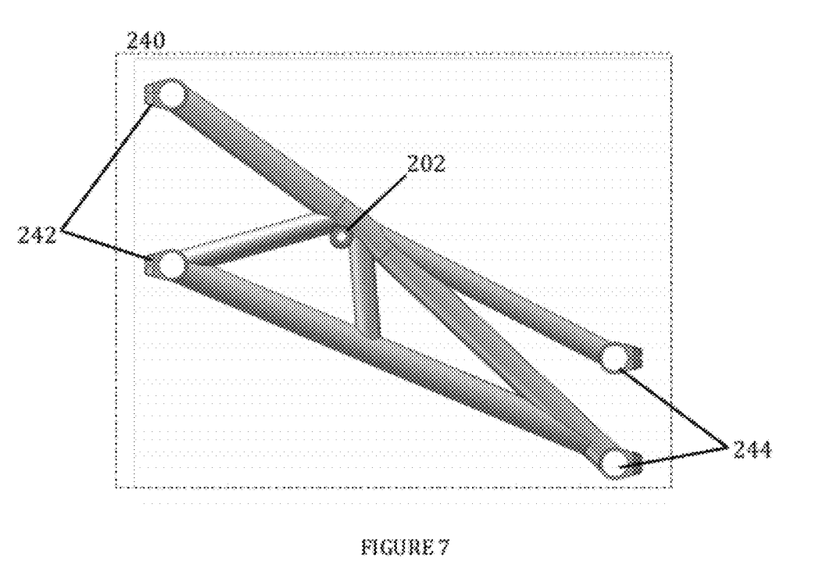
FIG. 7 is a schematic representation of a side frame as seen from a side view.

As shown in FIG. 3A, the left and right side frames 240 of the electric vehicle 100 preferably function to couple the steering head unit 220 to power unit casing 260, to distribute loads between the front and rear suspensions, and to mount the battery assembly 160. The left and right side frames 240 define the left and right sides of the cage 210. The left side frame 240 is preferably a mirror image of the right side frame 240, but may alternately be different. As shown in FIG. 7, the side frames 240 preferably comprise a top bar and a bottom bar coupled together by a truss-like structure, but may alternately comprise any load-bearing geometries. The side frames 240 are preferably made of metal tubing (e.g. steel or aluminum tubing), but may alternately be made of metal beams, polymer tubing, polymer beams. The side frames 240 each preferably include a steering head unit attachment point 242 that couples to the side frame attachment points 226 of the steering head unit 220, and a power unit casing attachment point 244 that couples to a side frame attachment points 266 of the power unit casing 260. As shown in FIG. 3A, the side frames 240 are preferably arranged substantially low on the vehicle and below where the user places his or her legs during use of the vehicle. This allows the side frames 240 to be arranged farther away from the mid-plane of the vehicle, thus defining a larger rectangular volume and allowing a larger battery assembly 160 to be placed within the cage 210. As shown in FIG. 3A, the steering head unit attachment point 242 of the side frames 240 preferably fastens to the side frame attachment point 226 of the steering head unit 220 by clamping over the side frame attachment point 226, but may alternatively be any other type of fastening method, such as bolting, screwing, welding, etc. Similarly, the power unit casing attachment point 244 preferably fastens to the side frame attachment point 266 of the power unit casing 260 by clamping over the side frame attachment point 266, but may alternatively be any other type of fastening method.

As aforementioned, the frame 200 may additionally couple to the internal support structure 162 to provide extra stability during vehicle operation. As shown in FIGS. 6A and 6B, the internal support structure 162 preferably accomplishes this by directly coupling to the four sides of the cage 210 (i.e. the steering head unit 220, the side frames 240, and the power unit casing 260), such that its rigidity prevents relative torsion between the four sides of the cage 210. The internal support structure 162 preferably couples to the cage 210 via a plurality of coupling points 202 on the steering head unit 220, the side frames 240, and the power unit casing 260. The internal support structure 162 preferably extends through the entirety of the cage interior along a substantially horizontal plane, but may alternately extend through the cage interior along an angled horizontal plane. The internal support structure 162 is preferably coupled to substantially the center of the cage 210, but may alternately be coupled above or below the cage center. The inclusion of the internal support structure 162 allows the frame 200 to be operable in two modes: an installed mode, wherein the battery assembly 160—and internal support structure 162—are coupled to the cage 210; and an uninstalled mode, wherein the battery assembly 160 is removed from the frame 200. In the installed mode, the steering head 224, side frames 240, power unit casing 260, and internal support structure 162 of the frame 200 preferably cooperate to provide the vehicle with structural rigidity to withstand the forces that may result from use of the vehicle. This is the preferred mode for user operation (e.g. sitting on the vehicle, riding the vehicle, resting the vehicle on a kickstand, etc.). For example, the frame 200 preferably allows the vehicle to support the weight of a user that rides the vehicle, the forces that result from the vehicle going over a bump on the road, the forces that result from turning around a curve, or any other suitable source of force on the vehicle. In the uninstalled mode, (for example, during maintenance or replacement of the battery pack), the steering head 224, the side frames 240, and the power unit casing 260 of the frame 200 preferably cooperate to maintain the relative position between the front suspension assembly 120, rear suspension assembly 140, and power unit 180 of the vehicle. The overall structural stability of the vehicle in the uninstalled mode may be less than that of the overall structural stability of the vehicle in installed mode. For example, when the battery pack is removed, the relative positions of the front suspension assembly 120, rear suspension assembly 140, motor 182, and transmission 184 of the vehicle may be maintained, but the vehicle may not be able to withstand the forces that result from vehicle operation (e.g. driving). Because the vehicle is preferably not used with the battery pack is removed, the decrease in the level of structural stability preferably does not have a detrimental effect on the performance of the vehicle.

As a person skilled in the art will recognize from the previous detailed description and from the figures and claims, modifications and changes can be made to the preferred embodiments of the invention without departing from the scope of this invention defined in the following claims.

We claim:

1. An electric vehicle including a first and a second wheel, the electric vehicle comprising:
    a battery assembly including a plurality of coupled cells;
    a motor electrically coupled to the battery assembly;
    a transmission coupled to the motor, wherein the transmission is substantially vertically positioned below the motor;
    a load bearing frame including:
        a steering head unit with a steering head, a left extension and a right extension;
        a power unit casing enclosing the motor and the transmission;
        a left side frame statically coupled to the left extension and the left side of the power unit casing;
        a right side frame statically coupled to the right extension and the right side of the power unit casing;
        wherein the steering head unit, power unit, left side frame, and right side frame form an open cage with an substantially unobstructed top and bottom;
    wherein the battery assembly is substantially located within the cage; and,
    wherein the first wheel is substantially centered between the left and right extensions.

2. The electric vehicle of claim 1, wherein the power unit casing is a unitary piece.

3. The electric vehicle of claim 1, wherein the frame forms a prismatic cage.

4. The electric vehicle of claim 1, wherein the motor directly drives the transmission.

5. The electric vehicle of claim 4, wherein the transmission includes a countershaft.

6. The electric vehicle of claim 5, wherein the motor includes two end bearings and the countershaft includes two end bearings, wherein the power unit casing locates one end bearing of the motor shaft and both end bearings of the countershaft.

7. The electric vehicle of claim 6, wherein the motor is an electric motor.

8. The electric vehicle of claim 1, wherein the transmission is positioned directly below the motor.

9. The electric vehicle of claim 1, wherein the cells are prismatic secondary cells.

10. The electric vehicle of claim 1, wherein the battery assembly further includes an internal support structure coupled to the cells, wherein the electric vehicle is operable in two modes:
    an installed mode, wherein the battery assembly is mounted to the steering head unit, the power unit casing, the left side frame and the right side frame; and,
    an uninstalled mode, wherein the battery assembly is decoupled from the frame.

11. The electric vehicle of claim 10, wherein the electric vehicle in installed mode has a higher resistance to torsion than the electric vehicle in uninstalled mode.

12. The electric vehicle of claim 11, wherein the installed mode is achieved by bolting the internal support structure to the steering head unit, the power unit casing, the left side frame and the right side frame, and the uninstalled mode is achieved by unbolting the internal support structure from the steering head unit, the power unit casing, the left side frame and the right side frame.

13. The electric vehicle of claim 12, wherein the internal support structure is a substantially continuous rectangular prismatic plate.

14. The electric vehicle of claim 12, wherein the battery assembly extends through the top of the open cage.

15. The electric vehicle of claim 12, wherein a subset of the cells are mounted to the bottom of the internal support structure.

16. The electric vehicle of claim 15, wherein the battery assembly extends through the bottom of the open cage.

17. The electric vehicle of claim 1, further including a rear suspension system coupled to the power unit casing, wherein the rear suspension system further includes a swingarm coupling a second wheel to the power unit casing, wherein the swingarm couples to the axle of the second wheel and to the lower portion of the power unit casing.

18. The electric vehicle of claim 17, wherein the swingarm mounts to both sides of the axle of the second wheel.

19. The electric vehicle of claim 17, wherein the swingarm is a single-sided swingarm and mounts to one side of the axle of the second wheel.

20. The electric vehicle of claim 17, wherein the rear suspension system further includes a seat that mounts to the power unit casing, wherein the left and right side frames couple to the power unit anterior to the seat.

21. An electric vehicle having an vertical center plane extending from the front to the rear, the electric vehicle comprising:
    a front wheel aligned in the plane such that the front wheel rotational axis is perpendicular to the center plane;
    a rear wheel aligned in the plane such that the rear wheel rotational axis is perpendicular to the center plane;
    a steering head unit coupled to the front wheel, the steering head unit including a steering head, a left extension and a right extension, wherein the steering head unit is substantially symmetric about the center plane;
a power unit adjacent the rear wheel, the power unit including:
an electric motor including a shaft, wherein the shaft is disposed horizontally and perpendicularly to the center plane;
a transmission disposed vertically beneath the power unit;
an unitary power unit casing enclosing the electric motor and the transmission;
a left side frame statically coupled to the left extension and to the left side of the power unit casing, wherein the left side frame is disposed to the left of the center plane;
a right side frame statically coupled to the right extension and to the right side of the power unit casing, wherein the right side frame is disposed to the right of the center plane;
a battery assembly comprising a plurality of prismatic secondary cells, stacked in the thickness direction and coupled to an internal support structure, wherein the steering head unit, power unit, left side frame, and right side frame form a substantially prismatic cage with an unobstructed top and bottom, wherein the battery assembly extends through the top and bottom of the cage and removably couples to the steering head unit, power unit, left side frame and right side frame by the internal support structure;
a swingarm rotatably coupled to the transmission portion of the power unit casing and the rear wheel; and
a left and a right footpeg to the left and the right of the center plane, respectively, wherein the left side frame and right side frame couple to the power unit casing anterior to the left and right footpegs, respectively.

22. A frame for an electric vehicle with a motor and a transmission, the frame comprising:
a steering head unit including a steering head, a left extension and a right extension, wherein the left extension and right extension extend at an angle from the steering head;
a power unit casing enclosing the motor and the transmission;
a left side frame mounted to the left extension and the left side of the power unit casing;
a right side frame mounted to the right extension and the right side of the power unit casing, wherein the steering head unit, the power unit, the left side frame and the right side frame form an open cage; and
an internal support structure, wherein the frame has two modes:
an uninstalled mode, wherein the internal support structure is decoupled from the cage; and
an installed mode, wherein the internal support structure is coupled to the cage, wherein the frame in installed mode is more resistant to torsion than the frame in uninstalled mode.

23. The frame of claim 22, wherein the internal support structure is coupled to the cage by mounting to the steering head unit, the power unit casing, the left side frame and the right side frame.

24. The frame of claim 23, wherein the internal support structure supports a battery assembly, wherein the battery assembly is located within the open cage.

25. The frame of claim 24, wherein the internal support structure traverses substantially horizontally through the interior of the open cage.

26. The frame of claim 24, wherein the internal support structure is a flat prismatic plate.

27. The frame of claim 23, wherein:
the steering head unit and the power unit casing each further include a plurality of side frame attachment points, wherein the left and right side frames mount to the steering head unit and the power unit casing by clamping over the side frame attachment points;
the installed mode is achieved by bolting the internal support structure to the steering head unit, the power unit casing, the left side frame and the right side frame, and
the uninstalled mode is achieved by unbolting the internal support structure from the steering head unit, the power unit casing, the left side frame and the right side frame.

28. The frame of claim 22, wherein the uninstalled mode is achieved by removing the internal support structure through the top of the cage.

29. The frame of claim 22, wherein the power unit casing is a substantially unitary piece.

30. The frame of claim 29, wherein the power unit casing encloses a substantially cylindrical motor positioned directly over the transmission, wherein the power unit substantially traces a portion of the profile of the motor, wherein the shaft of the motor is horizontal and substantially perpendicular to the left side frame and right side frame.

31. The frame of claim 22, wherein the left and right extensions each include a truss on the face forming a cage interior face.

32. The frame of claim 22 further including a rear suspension assembly, wherein the rear suspension assembly comprises a seat coupled to the top portion of the power unit casing and a swingarm coupled to the lower portion of the power unit casing.

33. The frame of claim 32 wherein the left and right side frames couple to the power unit casing substantially anterior to the seat.

34. The frame of claim 22, wherein the angle formed between the left and right extensions facing the cage interior is less than 180°.

35. The frame of claim 22, wherein the steering head includes bearings.

36. A frame for an electric vehicle comprising:
a steering head unit including a steering head and a left and right extensions extending at an angle from the steering head to the left and right, respectively;
a unitary power unit casing with a left and right side, the power unit casing configured to enclose a motor and a gearbox, wherein the substantially cylindrical motor is positioned substantially directly above the gearbox;
a left side frame clamped to the left extension and the left side of the power unit casing;
a right side frame clamped to the right extension and the right side of the power unit casing, wherein the steering head unit, power unit casing, left side frame and right side frame form an open cage substantially unobstructed on the top and bottom;
a substantially flat internal support structure that supports a battery assembly, the internal support structure including battery attachment points on the top and bottom surfaces, the internal support structure operable in two modes:
an installed mode, wherein the internal support structure is fastened to the steering head unit, the power unit casing, and the left and right side frames, such that the battery assembly is located within the open cage;

an uninstalled mode, wherein the internal support structure is unfastened from the steering head unit, the power unit casing, and the left and right side frames;
a front suspension assembly including a steering tube, wherein the steering tube extends concentrically through the interior of the steering head;
a rear suspension assembly including a seat and a swingarm, wherein the seat is coupled to the top portion of the power unit casing and the swingarm is rotatably coupled to the lower portion of the power unit casing;
wherein the left and right side frames clamp to the power unit casing anterior to the seat.

* * * * *